United States Patent Office 3,736,291
Patented May 29, 1973

3,736,291
POLY(ARYLENE OXIDES)
Herward A. Vogel, 2501 Hudson Road, Oakdale Township, Washington County, Minn. 55101
No Drawing. Continuation of application Ser. No. 567,367, July 25, 1966, which is a continuation-in-part of application Ser. No. 269,140, Mar. 29, 1963, both now abandoned. This application Oct. 14, 1971, Ser. No. 189,137
Int. Cl. C07c 43/28; C08g 23/00
U.S. Cl. 260—47 R      9 Claims

ABSTRACT OF THE DISCLOSURE

Film and fiber forming poly(arylene oxides) are produced from monomers of the formula X—Ar—OH wherein X is a halogen atom and Ar is a linear chain of from 2–10 unsubstituted phenylene groups bonded together directly or through ether oxygen. The monomer is converted to an alkali metal salt which is then heated in the presence of a copper catalyst.

---

This is a continuation of copending application Ser. No. 567,367, filed July 25, 1966, now abandoned, which was a continuation-in-part of application Ser. No. 269,140, filed Mar. 29, 1963, now abandoned.

This invention relates to the production of polymers and more particularly to a process for the preparation of useful poly(arylene oxides) and to certain precursors and products of that process.

It is an object of the invention to provide an efficient and practical process for the preparation of useful poly(arylene oxides). It is another object of the invention to provide a process for the preparation of highly useful poly(phenylene oxides). It is another object of the invention to provide a process for the preparation of useful film- and fiber-forming poly(phenylene oxides). It is another object of the invention to provide certain new and useful poly(arylene oxides). It is another object of the invention to produce certain useful phenylene oxide-biphenylene oxide polymers. It is another object of the invention to produce useful film- and fiber-forming poly(phenylene oxide-biphenylene oxides). Other objects of the invention will be apparent from the following disclosure.

In accordance with the above and other objects of the invention, it has been found that highly useful poly(arylene oxides) can be prepared by:

(1) Reacting a monomer of the formula:

X—Ar—OH wherein X is a halogen atom (preferably bromine, chlorine or iodine and more preferably bromine or iodine), Ar is a linear chain of from 2 to 10 (preferably, 2 to 6 for reasons of ease of monomer preparation) unsubstituted phenylene groups bonded together directly or through ether oxygen with an equimolar amount of an alkali metal or alkali metal hydroxide in the presence of an inert water immiscible aromatic ether or aromatic hydrocarbon solvent to form the alkali metal salt of the monomer, (2) Removing the water present in the reaction mixture, (3) Charging the monomer salt, the solvent and 0.01 to 0.3 mole percent of a copper catalyst to a reaction vessel, and (4) Heating the mixture to a polymerization temperature of 200–300° C. for at least ½ hour in an inert environment.

Ordinarily, it is neither necessary nor preferable to continue the polymerization for more than 10 hours, although a longer polymerization time can be used. It is convenient but not necessary to utilize a system in which the monomer salt and catalyst are soluble in the solvent at the reaction temperature.

The polymerization step involves a modified melt condensation procedure involving the repeated reaction between an aromatic alkali oxide group and an aromatic halide group in the presence of a copper condensation catalyst. The preparation of the polymer from the hydroxide monomer can be carried out in a single operation by charging the monomer, the alkaline material, the solvent and the catalyst to a vessel, replacing the air therein by an inert atmosphere, heating the mixture to a temperature sufficient to convert the monomer to its alkali metal salt, removing the water present (including that which is liberated in the conversion in case an alkali metal hydroxide is used), e.g. by distillation, and then further heating the mixture to induce polymerization. Alternatively, the process can be interrupted after preparation of the alkali metal salt and the latter recovered, dried and stored under ordinary conditions. The salt can then at some later time be redissolved in solvent, the catalyst added and the polymerization carried out as before (it being necessary to carry out the polymerization in contact with only the inert atmosphere and with prior removal of all water from the system). Since the catalyst is needed for the polymerization step only, it is not necessary that it be present during the preparation of the alkali metal salt if the salt is to be isolated.

The inert atmosphere in the reaction vessel during polymerization is made necessary by the relative sensitivity of the system to water, air and oxygen. These substances if present in or in contact with the reaction mixture during polymerization make it impossible to attain the high molecular weights necessary to forming polymers having useful properties when they are in the form of films and fibers. In addition, they tend to reduce the yield of the polymer, lower its molecular weight and often cause the polymer to be colored. An inert atmosphere suitable for contact with the reaction mixture can be either an inert gas such as nitrogen, or an environment of greatly reduced pressure, preferably about 2 mm. of mercury or less. In some cases an atmosphere of nitrogen is used which is adjusted to a pressure at which refluxing takes place within the desired temperature range. The advantages of carrying out the polymerization at reflux are the ease of holding the reaction temperature and the good mixing which the refluxing causes.

The conversion of the monomer hydroxide to the alkali metal salt and the removal of the water are ordinarily carried out below the temperature at which the polymerization reaction takes place. Commonly this is at a temperature of about 200° C. although temperatures ranging from about 25° to 250° C. can be used. The reaction mixture is heated further to a temperature of from about 200 to 300° C. to induce polymerization. The higher temperature is then maintained for from about one half to ten hours to complete the polymerization. In case an alkali metal (e.g. potassium or sodium) is used in place of an alkali metal hydroxide (e.g. potassium hydroxide or sodium hydroxide) hydrogen is released in place of water in the formation of the salt. Residual water must still be carefully removed, however. The hydrogen, although it is not as deleterious to the polymerization reaction as is water, oxygen, or air, is preferably removed as it is formed or at least before polymerization begins.

The polymerization catalysts which are useful in the process of the present invention are copper compounds which form a soluble complex in the reaction mixture, said complex containing an available copper cation under the conditions of the reaction. The preferred catalysts are the copper salts of lower aliphatic carboxylic acids (those containing not more than eight carbon atoms) such as cupric acetate and cupric propionate, copper phenolates, cupric oxide and certain copper halides such as cupric bromide, cuprous bromide and cuprous iodide. They are generally used in amounts ranging from about 0.01 to 0.3 mole percent (based on the amount of monomer). Although a higher catalyst level can be utilized, it is generally unnecessary and is ordinarily avoided since larger amounts can negatively affect the degree of polymerization and the separation of the catalyst from the polymer is sometimes difficult.

The inert solvents are generally utilized in the process in order to increase the fluidity of the mixture and insure uniformity of distribution of the reactants and the temperature thereof. In addition they provide a completely inert reaction medium even at high temperatures and are good solvents for the alkali metal salt of the monomer, the active catalyst system and the growing polymer itself. On the other hand, the alkali halide which is formed in the polymerization process is highly insoluble in these solvents and therefore separates conveniently as a fine suspension. The preferred solvents are aromatic ethers such as diphenyl ether, diphenoxy diphenyl ether, resorcinol diphenyl ether, dinaphthyl ether, dibenzofuran, etc. and aromatic hydrocarbons such as diphenyl, m-terphenyl, etc. It is ordinarily not necessary to use more than twice the amount of monomer present of solvent on the weight basis.

Among the monomers suitable for use in the process of the invention are those listed in Table I, infra. It is noted that in the monomer precursors of the process the hydroxyl and halogen groups are carried by different aromatic rings. This has been found to be necessary if high molecular weight polymers which have valuable properties are to be obtained using this process. The polymers are broadly useful, particularly as coatings which can be applied from solution or melt and as molded articles. When so used they exhibit excellent properties of resistance to hydrolytic, thermal and oxidative degradation and chemical corrosion. They are particularly useful in applications as electrical insulating materials where severe and corrosive conditions exist. In addition, certain of them are of particular value as film- and fiber-formers. The polymers generally have inherent viscosities above about 0.25 (when measured as 1 percent solutions in sulfuric acid) and preferably have inherent viscosities above 0.30. They have melt temperatures ranging from 100° C. to above 400° C., depending upon the particular monomer charges used, and can withstand temperatures of up to 500° C. without material degradation. Preferred among the various embodiments of the process of the invention are those in which polymers of the following two types are prepared:

(I) Repeating phenylene oxide groups, i.e.

(II) Alternating phenylene oxide and biphenylene oxide groups in the polymer chain, i.e. having repeating units of the type

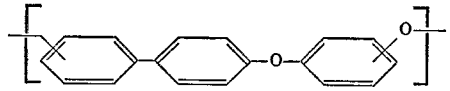

(Often called simply poly(phenylene oxidebiphenylene oxide)s herein).

The reasons for this are general overall economy of preparation and superior properties of these polymers. One valuable class of polymers of the poly(phenylene oxide) type which can be prepared by the process of the invention contain not less than 80% para- nor more than 15% ortho-phenylene oxide units, i.e. they contain at least 80 mole percent of paraphenylene oxide units with the remainder up to 100% consisting of ortho- and meta- phenylene oxide units, provided that not more than 15% of the total is ortho. They also have:

(1) melting points of from 220 to 295° C. as determined by DTA (differential thermal analysis)
(2) inherent viscosities measured as 1% solutions of polymer in concentrated sulfuric acid (98% assay) of at least 0.3
(3) substantially complete solubility in diphenyl ether at 225° C. in the ratio of 5 parts by weight of polymer to 95 parts of solvent, and which form films having tensile strengths of at least 5000 p.s.i. in unoriented state, which films can be stretched biaxially to at least four times their original areas.

The poly(phenylene oxide-biphenylene oxides), II above, which are produced by the process of the invention also form an important aspect thereof. These polymers form useful strong self-supporting thermoplastic films and filaments in addition to having the coating utility which is common to all of the products of the process. They have inherent viscosities measured from 1 percent solutions of polymer in sulfuric acid of at least 0.25 (preferably 0.30), substantially complete solubility in paraphenyl phenol at 300° C. in the ratio of 5 parts by weight of polymer to 95 parts of solvent and weight losses of less than 5 percent at 400° C. after heating the polymer from 25° C. at a rate of 6° C. per minute. The inherent viscosity of 0.30 or greater is preferred as providing consistently good fiber and film properties. Included in the areas of utility of these films are backings for various types of tapes, electrical insulations, lamination to substrates for corrosion protection, weatherability resistance, etc.

Also of interest are the copolymers of two or more monomers of the formula X—Ar—OH (wherein X and Ar are as previously defined) in which at least one monomer contains phenylene groups bonded directly together and at least one other monomer contains phenylene groups bonded together through ether oxygen.

Another aspect of the present invention is a novel class of compounds which are useful as monomer precursors for the process of the invention. These are the 4-(p-bromophenyl)-hydroxy-diphenyl ethers which have the formula:

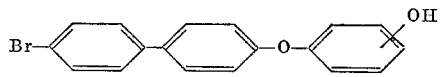

and are used to prepare the poly (phenylene oxide-biphenylene oxides). These compounds are prepared in general by the interreaction of 4,4'-dibromodiphenyl, an ortho-, meta- or para-lower alkoxy phenol and an alkali metal hydroxide, such as sodium hydroxide or potassium hydroxide in the presence of a copper-containing catalyst such as copper powder or cupric oxide to form the 4-(p-bromophenyl)-alkoxy-diphenylether and then reacting that material in turn with pyridine hydrochloride to form the desired compound. The copper powder which is useful as a catalyst in the process of the invention must have small amounts of copper salts, e.g. copper oxides, on the surfaces of the particles thereof. Commercially available copper powder is a suitable catalyst although an extremely pure copper powder containing no copper salts is not a catalyst for the process of the invention.

The following examples illustrate more specifically the preferred embodiments of the invention but are not to be construed as limiting thereof. Unless otherwise specifically indicated, the following apply in the examples: All parts are by weight and the melting points are determined by DTA (differential thermal analysis). The inherent viscosities are determined at 25° C. using a 1% solution of the polymer in concentrated sulfuric acid (98 percent assay), said solution being prepared by heating the polymer and acid together, e.g. 30 minutes at about 150° C. is ordinarily sufficient.

EXAMPLE 1.—MONOMER PREPARATION

Among the monomers which can be used in this process are those listed in Table I.

TABLE I

| Designation | Name | Structural formula | Melting point or boiling point |
|---|---|---|---|
| A | 4-bromo-4'-hydroxydiphenyl ether | Br—⌬—O—⌬—OH | M.P. 83–84° C. |
| B | 4-(p-bromophenoxy)-4' hydroxy-diphenyl ether. | Br—⌬—O—⌬—O—⌬—OH | M.P. 130–131° C. |
| C | 4-(p-bromophenoxy)-4'-(p-hydroxyphenoxy) diphenyl ether. | Br—⌬—O—⌬—O—⌬—O—⌬—OH | M.P. 169–170° C. |
| D | 4-(p-bromophenoxy)-3'-hydroxy-diphenyl ether. | Br—⌬—O—⌬—O—⌬(OH) | M.P. 89–90° C. |
| E | 4-bromo-3'-hydroxydiphenyl ether | Br—⌬—O—⌬(OH) | B.P. 170–172° C./1.5 mm. Hg. |
| F | 4-(p-bromophenoxy)-2'-hydroxy-diphenyl ether. | Br—⌬—O—⌬—O—⌬(OH) | M.P. 50–52° C. |
| G | 4-(p-bromophenoxy phenoxy)-4'-(p-hydroxyphenoxy phenoxy) diphenyl ether. | Br[—⌬—O—]₆H | M.P. 204–206° C. |
| H | 4-iodo-4'-hydroxydiphenyl ether | I—⌬—O—⌬—OH | M.P. 82–83° C. |
| I | 4-chloro-4'-hydroxydiphenyl ether | Cl—⌬—O—⌬—OH | M.P. 83–84° C. |
| J | 4-(p-bromophenyl)-2'-hydroxy-diphenyl ether. | Br—⌬—⌬—O—⌬(OH) | M.P. 134–135° C. |
| K | 4-(p-bromophenyl)-3'-hydroxy-diphenyl ether. | Br—⌬—⌬—O—⌬(OH) | M.P. 137–138° C. |
| L | 4-(p-bromophenyl)-4'-hydroxy-diphenyl ether. | Br—⌬—⌬—O—⌬—OH | M.P. 172–173° C. |
| M | (4-bromonaphthyl)-4'-hydroxyphenyl) ether. | Br—(naphthyl)—O—⌬—OH | B.P. 205–210°/ 1.5 mm. Hg. |

Detailed preparations of some of these are as follows:

Monomer A

A mixture of 560 g. of p-bromoanisole, 400 g. of phenol (Mallinkrodt Chemicals), 125 g. of powdered sodium hydroxide and 2 g. of cupric oxide is placed in a 2-l. flask fitted with a stirrer and condenser. The mixture is heated for about 30 minutes at 200° C. to distill off most of the liberated water. The temperature is then cautiously raised to 225° C. to initiate the reaction and maintained at 225° for 1½ hours. The product is poured into hot water. The oily organic layer is separated and distilled under reduced pressure. The main fraction of p-methoxy diphenyl ether boils at 150–165°/20 mm. Hg. The yield is 505 g.

400 g. of p-methoxydiphenyl ether are dissolved in 2 l. of heptane and placed in a 4-l. flask fitted with a stirrer, dropping funnel and gas outlet. While the flask is cooled by an ice-water bath to 10° C., 320 g. of bromine dissolved in 400 ml. of carbon tetrachloride are added via the dropping funnel within about 15 minutes. The liberated hydrogen bromide gas is discharged in a water trap. After all of the bromine has been added, the cooling bath is removed and the mixture allowed to stand for 2 hours at room temperature and fractionated by vacuum distillation. After removal of the solvents the 4-bromo-4'-methoxydiphenyl ether product boils at 150–165°/1.5 mm. Hg. The yield is 510 g. The product crystallizes to a white solid, melting at 73–75° C.

A mixture of 510 g. of 4-bromo-4'-methoxydiphenyl ether and 1000 g. of anhydrous pyridine hydrochloride is heated at 240° C. for 30 minutes with vigorous stirring. The reaction mixture is poured into hot water and the separating oil distilled under reduced pressure. The product distills at 180–190°/1.5 mm. Hg. The yield is 435 g. After recrystallization from benzene-heptane 310 g. of 4-bromo-4'-hydroxydiphenyl ether melting at 80–82° C. is obtained. After a second recrystallization the product melts at 83–84° C.

Monomer B 4-(p-bromophenoxy)-4'-methoxydiphenyl ether is prepared from a mixture of 248 g. (2 mole) of commercial p-methoxyphenol, 850 g. (2.6 mole) of commercial bis(p-bromophenyl) ether, 80 g. (2 mole) of sodium hydroxide and 20 g. of copper powder using the same reaction conditions as in the first step of the preparation of Monomer A. Fractional distillation of the reaction product (after precipitation in water) yields 285 g. of crude product distilling in the range of 190–220°/1 mm. Hg. This material is treated with pyridine hydrobromide at 240° for 20 minutes, precipitated in water and the product distilled under reduced pressure. Yield: 214 g. of 4-(p-bromophenoxy)-4'-hydroxydiphenyl ether B.P. 230–240°/0.5 mm. Hg. Overall yield based on p-methoxyphenol, 30%. The product melts at 130–131° C. after recrystallization from benzene.

Monomer C

A well stirred mixture of 220 g. of 4-bromo-4'-hydroxydiphenyl ether (Monomer A), 55 g. of powdered potassium hydroxide (85% assay) and 220 ml. of dimethylformamide is heated on a steam bath and 106 g. of commercial benzylchloride is added in small portions. The mixture is then heated to boiling for 10 minutes and the reaction product is recovered by precipitation in water and recrystallized from acetone-methanol. The yield of 4-bromo-4'-benzyloxy-diphenyl ether is 220 g., M.P. 105–107°.

4 - bromo - 4' - benzyloxy - diphenyl ether (170 g., 0.5 mole), 33 g. (0.5 mole) of potassium hydroxide, 90 g. of commercial p-methoxy phenol and 5 g. of copper powder are heated together to 225° and maintained at that temperature for 1½ hours with agitation. The product is precipitated in water and recrystallized from dimethylformamide/acetone. A total of 155 g. of 4-(p-methoxyphenoxy)-4'-benzyloxy-diphenyl ether is obtained, M.P. 140–142°.

A solution of 155 g. of 4-(p-methoxyphenoxy)-4'-benzyloxy-diphenyl ether in 1500 ml. of glacial acetic acid and 100 ml. of 48% hydrobromic acid is heated for 40 minutes to gentle boiling. After addition of 100 ml. of water the solution is cooled and allowed to crystallize and product is recrystallized from benzene. 4-(p-methoxyphenoxy)-4'-hydroxy-diphenyl ether (98 g.) is obtained, melting at 134–135°.

4-(p-methoxyphenoxy)-4'-hydroxy-diphenyl ether (98 g., 0.3 mole), 210 g. (0.9 mole) of commercial p-dibromobenzene, 13 g. (0.3 mole) of sodium hydroxide and 1 g. of cupric oxide are heated together at 235–240° for 1 hour with agitation. The reaction mixture is then poured into water and the precipitate is recrystallized from dimethylformamide-acetone. Final distillation at 270–290°/0.5 mm. Hg. gives 50 g. of 4-(p-bromophenoxy)-4'-(p-methoxyphenoxy) diphenyl ether.

A mixture of 50 g. of 4-(p - bromophenoxy) - 4' - (p-methoxy-phenoxy) diphenyl ether and 100 g. of commercial anhydrous pyridine hydrochloride is heated at 245° for 20 minutes and precipitated in hot water. The recovered product is dried and recrystallized from toluene using decolorizing charcoal. 38 g. of 4-(p-bromophenoxy)-diphenyl ether is obtained melting at 169–170°.

*Analysis.*—For C$_{24}$H$_{17}$O$_4$Br (449.3), Calcd. (percent): C, 64.20; H, 3.84. Found (percent): C, 64.4; H, 4.0.

Monomers D and F are prepared in manners similar to the preparation of Monomer B but using m-methoxyphenol and o-methoxyphenol respectively in place of p-methoxyphenol. Monomer E is prepared in the same way as Monomer B but using m-methoxyphenol in place of p-methoxyphenol and p-dibromobenzene in place of bis(p-bromophenyl)ether. Monomer G is prepared from 4-(p-bromophenoxy)-4'-hydroxy diphenyl ether (Monomer B) as follows:

hydroxide and 4 g. of cupric oxide is melted together at 220° and stirred. The temperature is then increased to 230° and maintained for ½ hours at 230–235°. The product is recovered by precipitation in water and distilled. 255 g. of 4-(p-bromophenyl)-2'-ethoxy-diphenylether is obtained, boiling at 220–240°/1 mm. Hg. This product is treated with 400 g. of pyridine hydrochloride at 245° for ½ hour. The reaction mixture is poured into hot water and the product distilled. 210 g. (30%) of 4-(p-bromophenyl)-2'-hydroxy-diphenyl ether is obtained, boiling at 230–235°/1 mm. Hg. The product is recrystallized from benzene/heptane and is found to have a melting point of 133–134°.

*Analysis.*—Calcd. for C$_{18}$H$_{13}$O$_2$Br (341.3) (percent): C, 63.2; H, 3.84. Found (percent): C, 64.1; H, 4.0.

MONOMER L

A mixture of 312 g. (1 mole) of 4,4'-dibromobiphenyl, 124 g. (1 mole) of p-methoxyphenol, 40 g. of powdered sodium hydroxide, 4 g. of copper powder and a trace of cupric oxide is slowly heated to 235°. The thick mass is stirred and held at 235–245° for 1½ hours. 200 ml. of dimethylformamide are then added and the product is recovered by precipitation in water. Fractional distillation gives 132 g. of 4-(p-bromophenyl)-4'-methoxy-diphenyl ether, boiling at 220–240°/1 mm. Hg.

4-(p-bromophenyl)-4'-methoxy-diphenylether (132 g.) is treated with 200 g. of pyridine hydrochloride at 235–240° for 20 minutes. The melt is poured into water and the precipitate recovered by filtration and dried then recrystallized from toluene and then from methanol using decolorizing charcoal. 68 g. of 4-(p-bromophenyl)-4'-hydroxy-diphenyl ether are obtained melting at 170–171°.

*Analysis.*—Calcd. for C$_{18}$H$_{13}$O$_2$Br (341.3) (percent): C, 63.2; H, 3.84. Found (percent): C, 63.0; H, 3.4.

MONOMER K

Monomer K is prepared in the same way as Monomer L but replacing p-methoxyphenol with m-methoxy phenol. The 4-(p-bromophenyl)-3'-hydroxy-diphenyl ether is purified by distillation and recrystallization from benzene-petrol ether, M.P. 137–138°.

*Analysis.*—Calcd. for C$_{18}$H$_{13}$O$_2$Br (341.3) (percent): C, 63.2; H, 3.84. Found (percent): C, 63.3; H, 3.9.

EXAMPLE 2.—POLYMER PREPARATION

A mixture of 53.0 g. of Monomer A, 8.3 g. of powdered sodium hydroxide (98% assay), 120 g. of diphenyl ether and 0.04 g. of cupric oxide is placed in a 250 ml. flask fitted with a Claisen head, receiving flask and gas outlet. The apparatus is purged with nitrogen by repeated evacuation and refilling. The flask is heated in a silicon oil bath to 200–250° C. for 15 minutes and the pressure therein is reduced to about 20 mm. Hg for an additional 15 minutes in order to remove all of the liberated water from the reaction site by distillation. About 20 ml. of the diphenyl ether solvent is allowed to distill off during this period. The pressure is then equalized again with nitrogen

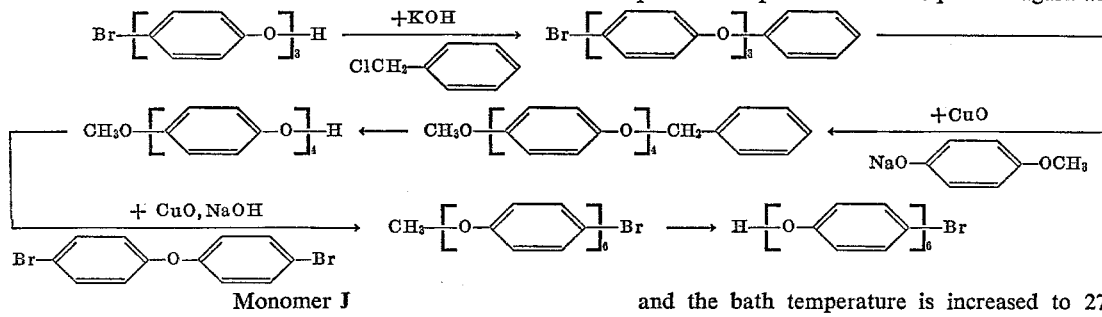

Monomer J

A mixture of 700 g. of 4,4'-dibromobiphenyl, 280 g. (2 mole) of o-ethoxy phenol, 84 g. (2 mole) of sodium and the bath temperature is increased to 270–280° C. rated sodium bromide as a fine suspension. 100 g. of hot After 6 hours a viscous melt is obtained containing sepaphenol are added and the reaction mixture is poured into 1500 ml. of hot (130° C.) dimethylformamide which contains 20 ml. of hydrochloric acid. After cooling the precipitated poly(p-phenylene oxide) is recovered by filtration, washed with acetone and water and dried. The yield is 32 g.

Polymers are also prepared from Monomers B, C, D, F, J, K, and L using the same general procedure. The details of the preparation of these polymers are given in Table II. The preparation of the polymer from Monomer A set out above is included in the table for comparison. The water is removed in the early part of each reaction usually, but not always, before the temperature has reached 250° C.

A portion of the polymer is molded into thin films between aluminum foil sheets at 580–600° F. and a pressure of 500 p.s.i. After immediate quenching in cold water the resulting amorphous film is transparent, flexible and tough and can be stretched biaxially to 4 times its original area and heat set to give oriented films with increased tensile strength. The tensile strength of the unoriented film 5,000–7,000 p.s.i. at 25° C.

Other properties of this unoriented film are as follows:

Refractive index, $n_D^{25}$ : 1.65
Density at 25° C.: 1.27–1.29
Modulus of elasticity at 25° C.: 150,000–200,000 p.s.i.
Elongation at 25° C.: 6–7.5%

TABLE II

| Charge | | | | | | | | | | | |
|---|---|---|---|---|---|---|---|---|---|---|---|
| Monomer | | | Solvent | | Catalyst | | Polymerization conditions | | | Polymer recovery procedure | Polymer product | |
| Designation | Amt. (gms.) | NaOH (gms.)[1] | Identification | Amt. (gms.) | Identification | Amt. (gms.) | Time (hrs.) | Temp. (°C.) | Environment | | Yield (gms.) | Designation |
| A | 53.0 | 8.3 | Diphenyl ether | 120 | Cupic oxide | 0.04 | 1/4, 1/4, 6 | 200–250, 250–270, 270–280 | Nitrogen, 20 mm. nitrogen, Nitrogen | (3) | 32 | A |
| B | 71.4 | 8.3 | Hydroquinone diphenyl ether | 70 | do | 0.05 | 1/6, 1 | 200–260, 270–290 | 1 mm, (2) | (3) | 49 | B |
| C | 22.46 | 2.1 | do | 20 | Cupric acetate | 0.01 | 1/6, 3/4 | 200–260, 260–300 | 1.5 mm, (2) | (3) | 17.5 | C |
| D | 17.8 | 2.1 | p,p'-Diphenoxy phenyl ether | 20 | Cupric oxide | 0.02 | 1/6, 2 | 250, 270–300 | 1 mm, 1 mm | (5) | 12.6 | D |
| F | 17.86 | 2.1 | Diphenyl ether | 4 30 | Cuprous bromide | 0.02 | 2 | 270 | Nitrogen | (6) | 12 | F |
| J | 34.2 | 4.2 | do | 4 40 | Cupric oxide | 0.02 | 1/4, 1/4, 3 | 200–250, 250–270, 270 | do, do, do | (6) | 24 | J |
| K | 17.06 | 2.1 | Hydroquinone diphenyl ether | 20 | do | 0.03 | 1/4, 1 | 200–260, 300–230 | 1 mm, (2) | (7) | 11.8 | K |
| L | 11.4 | 1.34 | p,p'-Diphenoxy phenyl ether | 15 | do | 0.03 | 1/4, 1/2 | 300, 350 | 1.5 mm, 1.5 mm | (8) | 4.7 | L |

[1] 98% assay, 2% water.
[2] Sufficient nitrogen added to maintain moderate reflux at the reaction temperature.
[3] Dissolve in boiling phenol, filter, precipitate in hot dimethylformamide containing a small amount of HCl, filter, wash with acetone and water, dry.
[4] Approximately half of the solvent is removed by distillation with the water of condensation before polymerization begins.
[5] Dissolve in dimethylformamide, filter, precipitate in ethanol, filter, wash with methanol and water and dry.
[6] Dissolve in chlorobenzene, filter, precipitate in methanol, filter, wash with methanol and water and dry.
[7] Same as 3 except precipitate in 3:1 methanol: dimethylformamide instead of dimethylformamide alone.
[8] Same as 3 except p-phenylphenol used in place of phenol.

EXAMPLE 3.—EVALUATION OF POLY(PHENYLENE OXIDES)

Polymers A, B and C are all poly(p-phenylene oxide) and vary only slightly from one another. Their melting points are respectively 290°, 290° and 295° C. and their inherent viscosities are respectively 0.35, 0.31 and 0.35. Other properties common to these polymers are as follows:

Hydrolytic stability.—Unaffected by 20% concentrated hydrochloric acid at 150° C. for 15 hours. Resists dilute and concentrated acid and bases, but is dissolved by conc. sulfuric acid at temperatures above about 150° C.

Hydrolysis resistance.—Unaffected by water 1 hr. at 300° F.

Thermal stability.—Dimensional and physical stability unchanged after 2 hours exposure in air to 275° C. After stabilization by progressive heating in air above 300° C. films retained their dimensional and physical strength at 370° C. in air for at least 2 hours and at 400° C. for at least ½ hour.

Solvent stability.—Resists most common organic solvents (heptane, ethanol, ethyl acetate, acetone, chloroform, xylene, N,N-dimethylformamide) but is slowly dissolved in phenol, tetrabromoethane, trichlorobenzene, N-methyl pyrrolidinone and phenyl ether at temperatures above 150° C. 6–8 parts of polymer dissolve in 95 parts of diphenyl ether at 225° C. thus indicating complete or substantially complete solubility of the polymer in the solvent.

X-ray diffraction studies reveal a highly crystalline structure of the polymer and differential thermal analysis shows a glass transition temperature for the polymer at 85–90° C.

Water absorption at 25°, 100% humidity, 24 hours: less than 0.4%
Dielectric constant at 25° C. and 1 kilocycle: 3.49
Dissipation factor at 25° C. and 1 kilocycle: 0.18 percent
Volume resistivity at 25° C.: $5.4 \times 10^{15}$ Amorphous, transparent films or tapes of poly(p-phenylene oxide) can also be prepared by direct extrusion through a die followed by immediate quenching of the hot films. The film can also be stretched at about 100° C. to yield an oriented polymer which can in turn be crystallized by heating above 100° C. for desired length of time. Fibers of this polymer can be prepared by drawing fibers from melt under nitrogen or by extruding the melt through a die to form monofilaments. The fiber can be quenched to form an amorphous fiber which subsequently can be oriented by stretching.

Polymer D has a crystalline structure as evidenced by X-ray diffraction patterns, melts at 160–180° C. and has an inherent viscosity of 0.27. It is soluble in dimethylformamide, pyridine and chlorobenzene and is insoluble in heptane and methanol. The polymer forms clear, flexible films when pressed at 420° F. and 500 p.s.i. pressure.

Polymer F has a melting range of 100–110° C. and an inherent viscosity of 0.32. It is insoluble in ligroin and alcohol but is soluble in many other solvents, e.g. dimethylformamide. It can be applied as a coating on metallic or nonmetallic substrates by casting from solvent solution. It can also be used to laminate or adhere glass and metal surfaces together.

Other poly(phenylene oxides) which can be prepared using the same polymerization procedures are shown in Table III.

TABLE III

| Monomer charge (proportion and monomer designation) | Ortho, meta and para phenylene oxide units in the resulting polymer (percent) | | |
|---|---|---|---|
| | Ortho | Meta | Para |
| 50% B, 50 D | 0 | 17 | 83 |
| 90% A, 40% E | 0 | 20 | 80 |
| 55% B, 45% F | 15 | 0 | 85 |
| 40% B, 30% D, 30% F | 10 | 10 | 80 |

These polymers have melting points between 220 and 295° C. inherent viscosities of at least 0.3 are substantially completely soluble in diphenyl ether at 225° C. in the ratio of 5 parts of polymer to 95 parts of solvent and form films having tensile strengths of at least 5000 p.s.i. in unoriented state.

In addition, other copolymers of the invention, e.g. of one or more monomers having phenylene groups bonded together through ether oxygen (such as Monomers A–I) with one or more monomers having phenylene groups bonded together directly (such as Monomers J–M), can be prepared using the foregoing polymerization procedures. An example of this is a copolymer of 50 mole percent of Monomer A and 50 mole percent of Monomer L.

EXAMPLE 4.—EVALUATION OF POLY(PHENYLENE OXIDE-BIPHENYLENE OXIDES)

Polymer J is soluble in most common organic solvents although it is insoluble in heptane and alcohol. It is substantially completely soluble in paraphenyl phenol at 300° C. in the ratio of 5 parts of polymer to 95 parts of solvent, loses 3.0 percent weight upon heating from 25° to 400° C. in air at a rate of about 6° C. per minute (a small sample of powdered polymer of the order of 100 milligrams, is heated in a small open test vessel), has a melting range of 170–190° C. and an inherent viscosity of 0.61. A portion of the polymer is pressed at 450° F. and 1000 p.s.i. into a colorless, tough and flexible film which can be oriented by biaxial stretching at 320° F. The unoriented film has the following properties:

Modulus of elasticity at 25° C.: 150,000 p.s.i.
Tensile strength at 25° C.: 7,000 p.s.i.
Elongation at 25° C.: 10%

| | 100 c. | 1 kc. | 10 kc. | 100 kc. |
|---|---|---|---|---|
| Electrical properties: | | | | |
| Dielectric constant at— | | | | |
| 23° C | 3.14 | 3.14 | 3.13 | 3.12 |
| 50° C | 3.12 | 3.10 | 3.09 | 3.07 |
| 75° C | 2.78 | 2.77 | 2.77 | 2.76 |
| 100° C | 2.72 | 2.72 | 2.71 | 2.71 |
| 125° C | 2.76 | 2.75 | 2.75 | 2.73 |
| 150° C | 3.26 | 3.10 | 3.03 | 3.00 |
| Dissipation factor in percent at— | | | | |
| 23° C | 0.14 | 0.13 | 0.17 | 0.21 |
| 50° C | 0.14 | 0.14 | 0.18 | 0.22 |
| 75° C | 0.14 | 0.13 | 0.16 | 0.18 |
| 100° C | 0.19 | 0.13 | 0.15 | 0.17 |
| 125° C | 0.52 | 0.13 | 0.12 | 0.13 |
| 150° C | 5.72 | 2.36 | 1.09 | 0.66 |
| Volume resistivity at— | | | | |
| 23° C | | $3.2 \times 10^{16}$ | | |
| 50° C | | $1.6 \times 10^{16}$ | | |
| 75° C | | $1.2 \times 10^{16}$ | | |
| 100° C | | $6.7 \times 10^{15}$ | | |
| 125° C | | $7.8 \times 10^{14}$ | | |
| 150° C | | $2.3 \times 10^{13}$ | | |

Polymer K is soluble in dimethylformamide, chlorobenzene and acetylene tetrachloride and is insoluble in ethylacetate, chloroform and acetone. X-ray diffraction studies indicated a crystalline structure for the polymer. It is substantially completely soluble in paraphenyl phenol at 300° C. in the ratio of 5 grams of polymer to 95 grams of solvent, loses 0 percent weight upon heating from 25° to 400° C. in air at a rate of about 6° C. per minute (tested by the same procedure as used for Polymer J), has a melting range of 210–220° C., an inherent viscosity of 0.29 and can be pressed into films having useful properties.

Polymer L is substantially completely soluble in paraphenyl phenol at 300° C. in the ratio of 5 grams of polymer to 95 grams of solvent, loses 4.4 percent weight upon heating from 25° to 400° C. in air at a rate of about 6° C. per minute (tested by the same procedure as Polymer J), melts at 360–370° C. and has an inherent viscosity of 0.29 (measured either as a 0.5% solution or a 1.0% solution in sulfuric acid). Differential thermal analysis on a sample of the polymer which is fused and then quick-chilled into the amorphous state indicates a glass transition temperature of 115–120°. The polymer can be molded into rather stiff films having useful properties by pressing at 720° F. and subsequently quenching in cold water.

Polymers J, K and L can all be formed into useful filaments by extruding, quenching and drawing according to known techniques.

EXAMPLE 5.—PREPARATION AND EVALUATION OF A HOMOPOLYMER OF MONOMER M

A mixture of 16.7 g. of Monomer M, 20 g. of hydroquinone diphenylether, 2.1 g. of powdered sodium hydroxide and 0.2 g. of cupric bromide is heated for 15 minutes in an oil bath at 200–250° C. under 1.5 mm. Hg pressure. During this period all of the liberated water is removed by distillation. The bath temperature is then increased to 280° and moderate boiling of the reaction mixture is maintained for 2 hours. The product is dissolved in dimethylformamide and the solution is filtered and the polymer precipitated in methanol. The recovered polymer has an inherent viscosity of at least 0.30 and flexible films can be pressed from the polymer at 400° F. and 500 p.s.i.

What is claimed is:

1. A process for the preparation of a poly(arylene oxide) having an inherent viscosity measured from a 1 percent solution of polymer in sulfuric acid of at least 0.25 which consists of heating a mixture of a compound of the formula

X—Ar—OH wherein X is a halogen atom and Ar is a linear chain of from 2 to 6 unsubstituted phenylene groups selected from the class consisting of phenylene groups which are bonded together directly and those which are bonded together through ether oxygen, an equimolar amount of a member of the class consisting of alkali metals and alkali metal hydroxides, an excess of an inert water immiscible solvent selected from the class consisting of aromatic ethers and aromatic hydrocarbons and 0.01 to 0.3 mole percent of a copper cation-releasing catalyst to a temperature of 200–300° C. for not less than ½ hour while continuously removing water, air and oxygen.

2. Film-forming polymers consisting essentially of repeating units of the formula

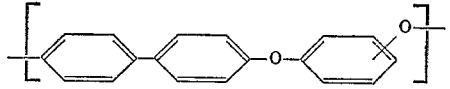

and having inherent viscosities measured from a 1 percent solution of polymer in sulfuric acid of at least 0.25, substantially complete solubility in paraphenyl phenol at 300° C. in a ratio of 5 parts by weight of polymer to 95 parts of solvent and weight losses of less than 5 percent at 400° C. after heating from 25° C. at a rate of 6° C. per minute in air.

3. Polymer according to claim 2 which have repeating units of the formula:

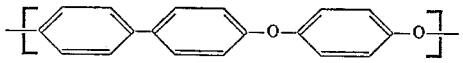

4. Polymers according to claim 2 which have repeating units of the formula:

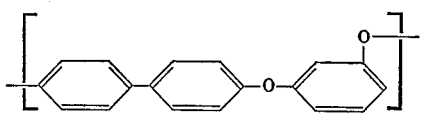

5. Polymers according to claim 2 which have repeating units of the formula:

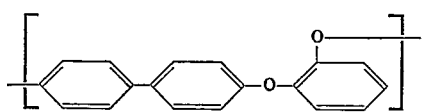

6. 4 - (p - bromophenyl)-hydroxy-diphenyl ethers having the formula:

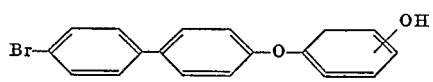

7. 4-(p-bromophenyl)-2'-hydroxy-diphenyl ether.
8. 4-(p-bromophenyl-3'-hydroxy-diphenyl ether.
9. 4-(p-bromophenyl)-4'-hydroxy-diphenyl ether.

References Cited
UNITED STATES PATENTS

| | | | |
|---|---|---|---|
| 3,083,234 | 3/1963 | Sax | 260—613 |
| 3,159,684 | 12/1964 | Merica | 260—613 |
| 3,228,910 | 1/1966 | Stamatoff | 260—47 |
| 3,268,478 | 8/1966 | Brown et al. | 260—47 |
| 3,332,909 | 7/1967 | Farnham et al. | 260—47 |

MELVIN GOLDSTEIN, Primary Examiner

U.S. Cl. X.R.

260—47 ET, 613 R